Patented Nov. 1, 1938

2,135,455

UNITED STATES PATENT OFFICE 2,135,455

ALCOHOLS FROM OLEFINES

Donald J. Loder, Wilmington, Del., assignor to E. I. du Pont de Nemours & Company, Wilmington, Del., a corporation of Delaware No Drawing. Application December 13, 1935, Serial No. 54,327

20 Claims. (Cl. 260—641)

This invention relates to the synthesis of organic compounds and more particularly to the preparation of aliphatic alcohols by the interaction of olefines with a hydrating agent.

Aliphatic alcohols have been prepared from olefines by hydration,—the reacting having been conducted both in the liquid and vapor phase. The liquid phase reaction usually involves the absorption of olefines such as ethylene in a strong mineral acid, or sulfuric acid, with the production from this specific olefine of ethyl ether and ethyl alcohol. In the vapor phase processes analogous products are obtained by passing the olefines and steam over a catalyst support such as pumice, kieselguhr, etc., impregnated with a catalyst such as a concentrated solution of sulfuric acid. The present invention involves improvements in the preparation of alcohols by similar processes wherein many of the difficulties heretofore encountered are overcome.

An object of the present invention is to provide an improvement in processes for the preparation of aliphatic alcohols and ethers which are formed by the hydration of olefinic hydrocarbons. A further object of the invention is to provide a process for the preparation of compounds containing a hydroxyl group directly linked to an alkyl group by the interaction of an olefine with a highly efficient hydration agent. A further object of the invention is to provide a process in which olefines are hydrated in the presence of a hydrating agent containing boron and fluorine. Other objects and advantages of the invention will hereinafter appear.

I have found that aliphatic alcohols and ethers can be prepared by a vapor or liquid phase reaction between steam or water and an olefinic hydrocarbon in the presence of a boron halogen containing hydrating agent. In order to effect the reaction in the vapor phase the reactants are contacted with a boron halide and steam under suitable pressure and temperature conditions. Usually I prefer to pass the reactants together with the halide over an absorbent material such as pumice, silica gel, coke, and the like, but more particularly over a form of active carbon such as activated charcoal. The activated charcoal or other absorbent material may or may not act as a support for activating constituents, such, for example, as the metal halides and more particularly the alkali and alkaline earth halides and the amphoteric metal halides.

Alternatively the hydration of olefines to alcohols may be conducted in the liquid phase if desired. The process may be carried out in this phase in a series of stages. In the first stage the hydrated boron fluoride is prepared by, for example, absorbing boron trifluoride in water to give a hydrating agent containing in the order of up to 5 or more mols of water per mol of boron trifluoride. There is some evidence that such a hydrated boron trifluoride is an addition compound of water and boron trifluoride although whether or not it is an addition compound or merely a mixture or solution of the boron trifluoride and water is immaterial, for in whatever form it is actually present it is exceptionally well adapted for the hydration of olefines to alcohols. The second stage of the process involves injecting an olefine into a hydrated boron fluoride under suitable pressure and temperature conditions which are in large measure governed by the particular type of olefine to be reacted and the amount of water present with the boron trifluoride.

The boron-halogen containing hydrating agents which I prefer to use include primarily various proportions of a boron halide and water. These hydrating agents may be readily prepared by reacting a boron halide with the required amount of water to give the desired hydrating agent. Of the boron trihalides I prefer especially boron trifluoride although the chloride, bromide, and iodide of boron may likewise be employed. Other boron halogen containing compounds which may likewise be employed as hydrating agents include dihydroxy fluoboric acid, borofluohydric acid, and in general the oxygenated acids obtained from mixtures of hydrofluoric acid and boric acid. The boron fluoride as well as the other hydrating agents may be used alone or in the presence of addition agents such as powdered nickel, nickel oxide, mercuric oxide, or other powdered metals or metal oxides which may be introduced, in amounts ranging from 1 to 5% of the boron halide, to promote the activity of the hydrating agents. Due to the excellent hydrating characteristics of boron fluoride, addition agents, to further extend its activity, are not ordinarily necessary.

The liquid phase process may be conducted in a continuous or discontinuous manner. In carrying out the hydration in a continuous manner steam and olefine are passed directly into a boron halide hydrating agent maintained at a temperature above the boiling point of the alcohol produced. The alcohol boils out of the reaction mixture and may be collected in any suitable manner such as by condensation or absorption. When conducted in a discontinuous manner a hydrated boron halide, such, for example, as boron fluoride is prepared containing up to about 5 mols of water per mol of boron fluoride, a 2 to 3 water to boron fluoride molal ratio being preferred, and into this hydrating agent the olefine is injected to substantial saturation. Water is then added and the reaction mass is distilled to drive off the alcohol present. The alcohol will come over as an aqueous alcoholic solution and the amount of water added is such that when all of the alcohol has been evolved there remains a water boron trifluoride addition compound containing in the order 2.3 to 2.5 mols of water per mol of boron fluoride. This addition compound may be used again for the preparation of subsequent batches of the alcohol.

The olefinic hydrocarbons suitable for use in my process are readily available from a number of sources; thus, ethylene, propylene, and various homologues thereof are found in gases evolved in cracking petroleum and may be separated therefrom, for example, by fractional liquefaction, or by copper liquor scrubbing. Mixtures of olefines may be used altho mixtures of alcohols and ethers will result. It is preferably, for the sake of avoiding undesirable side reactions, that the hydrocarbon which it is desired to convert be employed in a relatively high degree of purity.

When operating in the vapor phase the relative proportions of the reactants, i. e. the olefinic hydrocarbon and steam, can be varied through relatively wide limits, although usually the olefine is present in a slight excess on a molal basis.

The use of pressures in excess of atmospheric, say from 25 to 900 atmospheres, is preferred when operating in either the liquid or vapor phase although atmospheric pressures may be employed with a resulting lowering in quantity of output from a given equipment,—operation in the vapor phase should, in order to inhibit polymerization, preferably be conducted at pressures ranging up to 150 atmospheres. The reaction in either phase proceeds over a comparatively wide range of temperatures although the optimum temperature varies with specific cases depending inter alia upon the olefinic hydrocarbon being used. Generally, a satisfactory reaction can be obtained in the liquid or vapor phase at from 125–300° C. From the standpoint of practical operation the temperature should not be so low that the reaction rate is uneconomical, nor so high as to result in undesirable side reactions and/or polymerization of the raw materials. From this point of view the liquid or vapor phase process should preferably be operated within the range of 175–225° C.

The following examples will illustrate methods of practicing the invention, although the invention is not limited to the examples:

Example 1.—A gaseous mixture containing, by weight 5 parts of steam to 7 parts of ethylene, the steam being provided by the injection of the appropriate amount of a 10% aqueous solution of boron trifluoride containing one mol of water per mol of boron trifluoride, is passed into a conversion chamber containing activated charcoal. The chamber should be designed for the carrying out of exothermic gaseous reactions and the temperature maintained therein at approximately 175° C. while the pressure is held at approximately 25 atmospheres. Ethyl ether and ethanol are obtained.

Example 2.—In lieu of injecting the aqueous boron flouride into the reaction a 10% solution containing 3 mols of water per mol of boron fluoride may be injected to give a steam to gas ratio of .75 by weight, a temperature of 200° C. and a pressure of 100 atmospheres being employed. Any residual ethylene not converted to ethyl alcohol may be recirculated over the catalyst.

Example 3.—By conducting the reaction in the manner similar to that given in Example 1 but substituting propylene for the ethylene therein used and 5% anhydrous boron fluoride in lieu of the 10% boron fluoride solution injected into that reaction, a propyl alcohol will be obtained.

Example 4.—Into a silver lined shaker tube 2 mols of a water-boron fluoride addition compound containing one mol of water per mol of boron fluoride was charged and ethylene added at cylinder pressure. The temperature was raised to 120 to 150° C., and the reaction continued until one mol of ethylene was absorbed. The reaction mixture upon distillation gives a good yield of ethyl alcohol.

Example 5.—415 parts by volume of $(H_2O)_3BF_3$ was placed in a high pressure silver lined converter, an ethylene pressure of 800 pounds per square inch was applied and the two brought up to a temperature of 200° C. Ethylene was then passed thru the converted at a rate of 5.26 cubic feet per hour and the exit gas was passed thru a cold trap to recover the diethyl ether, water and ethanol formed. In a run of 5 hours approximately 255 parts by volume of water was injected and a product collected constituting 250 parts by volume, the organic portion of which analyzed, 35% diethyl ether and 65% ethanol. A conversion of 12.3% per pass was realized (8.8% to diethyl ether and 3.8% to ethanol).

Example 6.—The reaction described under Example 5 was continued with an injection of 6.3 cu. ft. of ethylene and 61.4 parts by volume of water per hour. At the end of two hours under these conditions the condensate revealed a conversion per pass of 13.1% of the ethylene to diethyl ether and ethanol, 8.2% to diethyl ether and 4.9% to ethanol.

The apparatus which may be employed for conducting these reactions may be of any conventional type and preferably one in which the temperature of exothermic reactions can be readily controlled at the desired value. Owing to the corrective action of the catalyst used, the interior of the converter and conduit leading therefrom should preferably be protected. This may be accomplished by coating the inner surfaces of the apparatus with copper, tantalum, or silver, or using for the construction of the equipment acid-resisting alloys of, for example, copper, molybdenum, cobalt, or tungsten.

Various changes may be made in the method hereinbefore described without departing from the invention or sacrificing any of the advantages that may be derived therefrom.

I claim:

1. A process which comprises hydrating an olefinic hydrocarbon characterized in that the olefinic hydrocarbon is hydrated in the presence of a boron halogen hydrating agent.

2. A process which comprises hydrating an olefinic hydrocarbon characterized in that the olefinic hydrocarbon is hydrated in the presence of a boron halogen hydrating agent under superatmospheric pressures and temperatures.

3. The process which comprises hydrating an olefinic hydrocarbon and thereby producing a compound containing a hydroxyl group directly linked to an alkyl group characterized in that the olefinic hydrocarbon is hydrated in the presence of a boron halogen hydrating agent and an absorbent material.

4. The process which comprises hydrating an olefinic hydrocarbon and thereby producing a compound containing a hydroxyl group directly linked to an alkyl group characterized in that the olefinic hydrocarbon is hydrated in the presence of a boron halogen hydrating agent and active carbon.

5. The process which comprises hydrating an olefine and thereby producing a compound containing a hydroxyl group directly linked to an alkyl group characterized in that the olefine is hydrated in the presence of a boron fluorine hydrating agent.

6. The process which comprises hydrating ethylene and thereby producing ethanol characterized in that the ethylene is hydrated in the presence of boron fluoride associated with water.

7. The process which comprises hydrating ethylene and thereby producing diethyl ether and ethanol characterized in that the ethylene is hydrated in the presence of boron fluoride associated with water.

8. The process which comprises hydrating propylene and thereby producing a propyl alcohol characterized in that the propylene is hydrated in the presence of boron fluoride associated with water.

9. The process which comprises hydrating butylene and thereby producing a butyl alcohol characterized in that the butylene is hydrated in the presence of boron fluoride associated with water.

10. In a process for the conversion of olefines to alcohols and ethers the steps which comprise forming a hydrating agent by the interaction of a boron halide with water and subsequently treating the olefine by contacting it with the thus formed hydrating agent.

11. In a process for the hydration of olefines to alcohols the steps which comprise reacting a boron halide with water, injecting into the resulting water boron halide product an olefine and subsequently removing from the reaction product the alcohol formed.

12. In a process for the preparation of alcohols by the hydration of olefines the steps which comprise continuously passing into a water and a boron fluoride hydrating agent an olefine and steam and continuously removing therefrom an aqueous solution of the corresponding alcohol.

13. In a process for the preparation of ethanol by the hydration of ethylene the steps which comprise reacting boron trifluoride with water giving a boron trifluoride-water complex compound containing 3 mols of water per mol of boron trifluoride, injecting ethylene in the resulting water-boron trifluoride mixture at a temperature of 120 to 150° C., and a pressure of 25 to 900 atmospheres and subsequently distilling from the reaction product diethyl ether and ethanol simultaneously with the introduction of water.

14. A process of preparing an aliphatic alcohol which comprises interacting an olefine and water in the presence of a boron halide.

15. A process of preparing an aliphatic ether which comprises interacting an olefine and water in the presence of a boron halide.

16. In a process of preparing an aliphatic alcohol from an olefine the steps which comprise preparing a mixture of the olefine, boron fluoride, and water and forming the alcohol as a result of the reaction effected in the mixture.

17. In a process of preparing an aliphatic ether from an olefine the steps which comprise preparing a mixture of the olefine, boron fluoride, and water and forming the ether as a result of the reaction effected in the mixture.

18. A process of preparing an aliphatic alcohol which comprises hydrating an olefinic hydrocarbon in an aqueous solution prepared by dissolving a boron halide in water.

19. A process of preparing an aliphatic alcohol which comprises hydrating an olefine in an aqueous solution prepared by dissolving a boron fluoride in water.

20. A process of preparing ethyl alcohol which comprises hydrating ethylene in an aqueous solution prepared by dissolving a boron fluoride in water.

DONALD J. LODER.